Figures 1, 2:
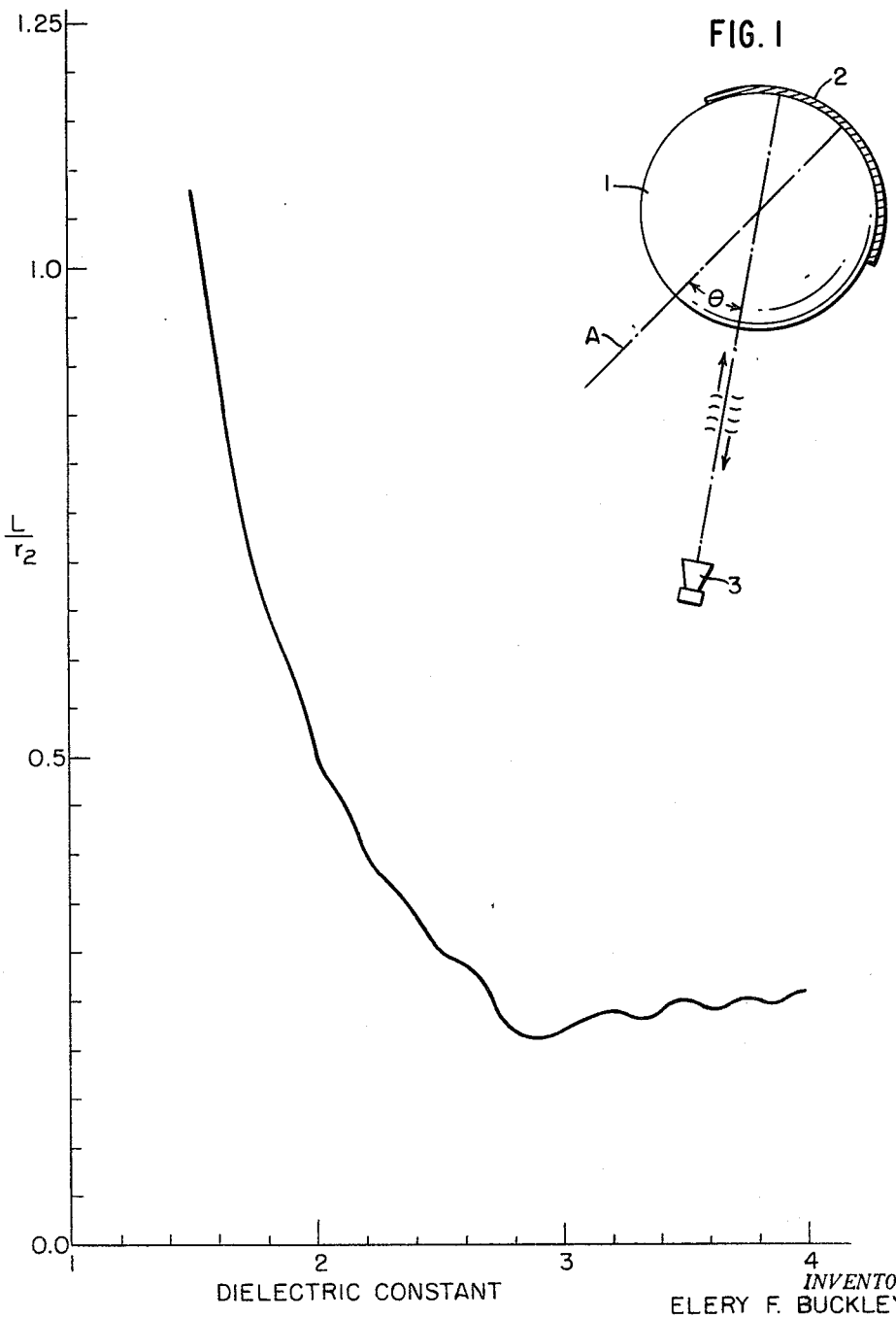

INVENTORS
ELERY F. BUCKLEY
WILLIAM R. CUMING
BY Kenway, Jenney & Hildreth
ATTORNEYS INVENTORS
ELERY F. BUCKLEY
WILLIAM R. CUMING
BY Jenway, Jenney & Hildreth

ATTORNEYS 3,145,382
MICROWAVE REFLECTOR
William R. Cuming, Sharon, and Elery F. Buckley, Concord, Mass., assignors to Emerson & Cuming, Inc., Canton, Mass., a corporation of Massachusetts
Filed Aug. 21, 1961, Ser. No. 132,960
1 Claim. (Cl. 343—18)

Our invention relates to microwave reflectors, and particularly to an improved reflector of novel construction and high efficiency.

Numerous efforts have been made to provide simple and inexpensive apparatus for reflecting and directing energy in the radar frequency range. Such reflectors are used, for example, as ground targets and as passive beacons for navigation. It is desirable for most purposes that such reflectors be functional when viewed from any direction within the widest possible solid angle. Thus, while a metal plate is one of the most efficient radar reflectors known, a flat metal plate is quite unsatisfactory as a wide-angle passive beacon because it functions essentially as an optical mirror and provides radar reflection back to the source only when viewed normal to its plane. More complex structures of special dielectric properties have been used. For example, the well known Luneberg lens, when combined with a reflective cap, provides high reflectivity over a relatively wide solid angle. As another example, the Eaton lens may be used as an omnidirectional reflector, but at a lower reflectivity. However, these lenses are difficult and expensive to construct. Specifically, the Eaton lens, as usually made, comprises a series of concentric spherical shells, each of which must have a different composition such that the dielectric constant varies approximately in accordance with the formula $k=(2-r_1)/r_1$, where $k$ is the dielectric constant at any point, and $r_1$ is the normalized radius of sphere; specifically, the ratio of the distance from the center of the sphere at that point to the total radius of the sphere. The Luneberg lenses must be similarly constructed, so that the dielectric constant varies from 2 at the center to 1 at the outside surface in accordance with the function $k=2-r_1^2$, where $r_1$ is the normalized radius of the sphere as defined above. The formulation and molding of the series of hemispherical shells required to produce these lenses is a tedious and costly operation.

The simplest omnidirectional reflector is a polished metal sphere. In view of their simplicity, hollow spheres having polished metal surfaces have been launched into space for use as communication satellites. However, the back scattering cross section of a metal sphere is so small relative to its diameter that such spheres must be made in very large sizes. The difficulty and expense of launching these large spheres thus tends to offset their apparent advantages.

It is, accordingly, a primary object of our invention to improve the characteristic of wide angle reflectors by reducing their complexity and cost, and by making it simpler to manufacture them in large sizes.

Our invention is organized about the discovery that a sphere having a uniform dielectric constant of about 2.4, when combined with a reflective cap at its surface, has suprising efficiency as a microwave reflector, being comparable in this respect to the best Luneberg-lens reflectors. By about 2.4, we mean approximately the range of 2.1 to 3.7, in which the essential advantages of our invention may be obtained, although we have found that the value of 2.4 is optimum for use as a capped reflector. However, where omnidirectional response is more important than maximum reflectivity, spheres made from uniform dielectric material having a dielectric constant in this range, and preferably toward the upper end of the range, may also be used as omnidirectional reflectors without the addition of any external reflecting surfaces. In addition, a sphere made in accordance with our invention may be used effectively as a lens antenna.

Figure 3:
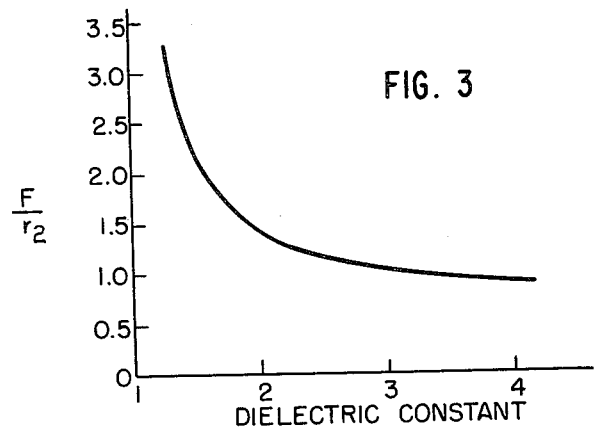
Figure 4:
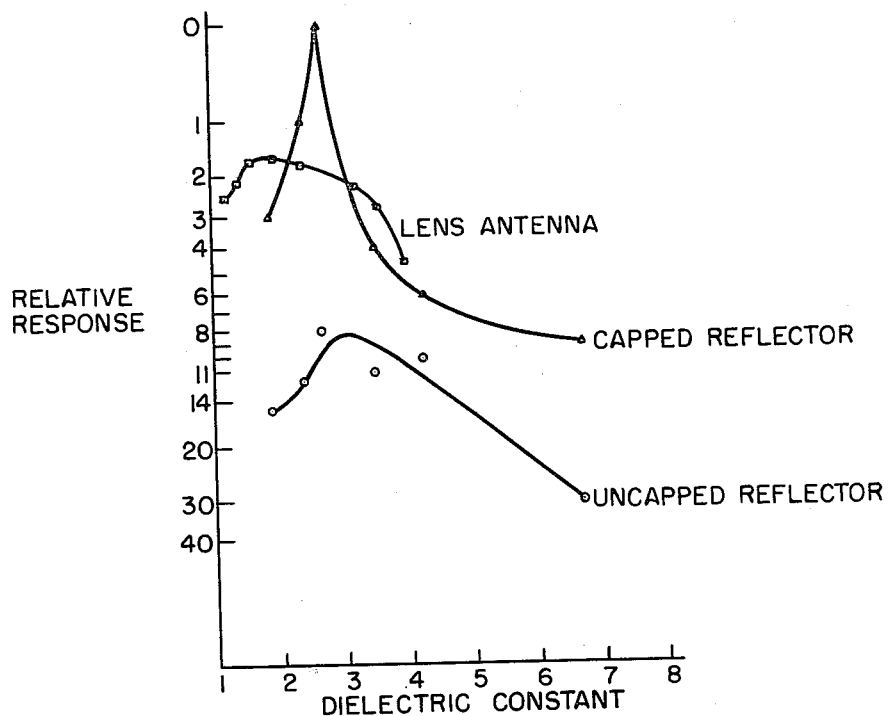
Figure 5:
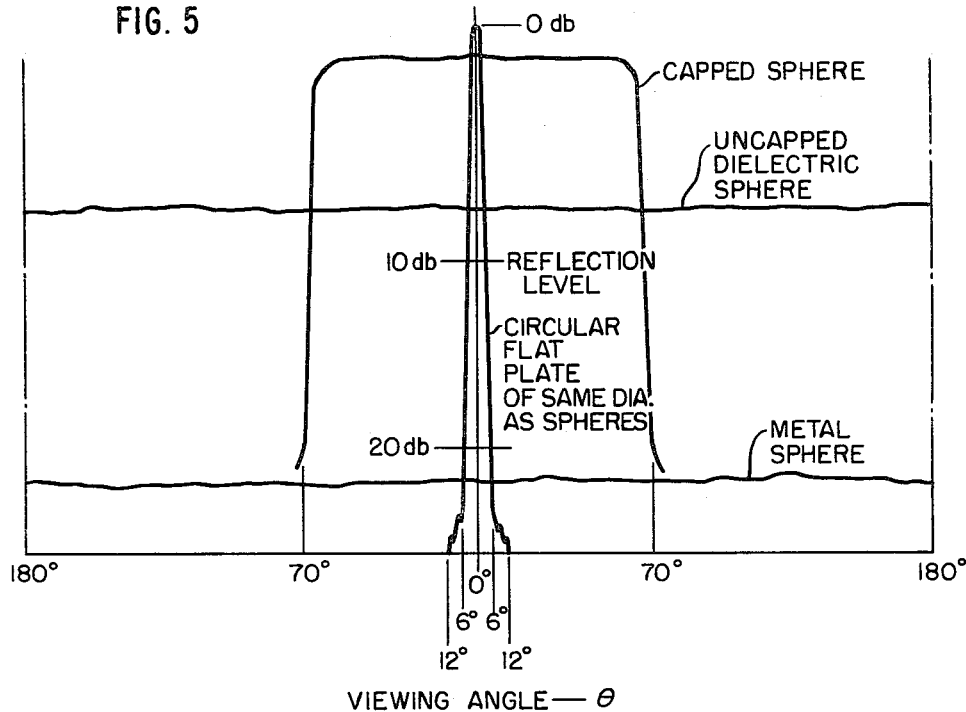
Figure 6:
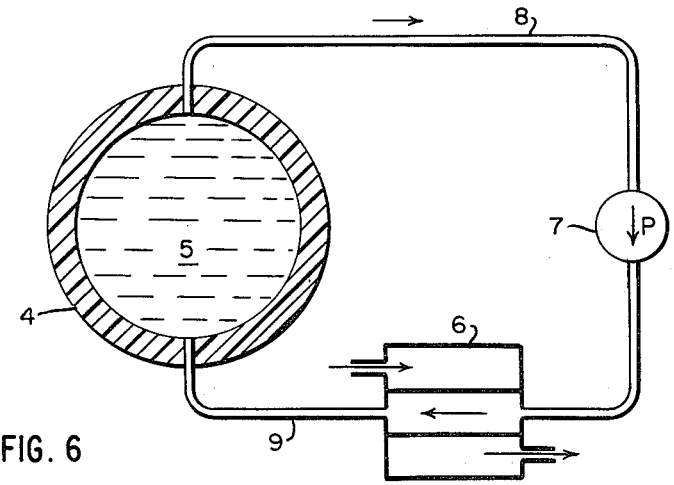

Our invention will best be understood by reference to the accompanying drawings, in which:

FIGURE 1 is a diagrammatic sketch of a microwave reflector in accordance with one embodiment of our invention, shown in operative association with a transceiver, FIGURE 2 is a graph of the length of the focal line of a sphere of uniform dielectric constant as a function of the dielectric constant, FIGURE 3 is a graph of the effective focal length of a sphere of uniform dielectric constant as a function of the dielectric constant, FIGURE 4 is a graph of the relative response of a sphere of uniform dielectric constant as a function of the dielectric constant when used as a capped reflector, an uncapped reflector, and a lens antenna, FIGURE 5 is a graph of reflected energy vs. viewing angle and illustrating the performance of the reflector of our invention compared with the performance of a flat circular plate and of a polished metal sphere of the same diameter, and FIGURE 6 is a diagrammatic cross-sectional view of a modification of our invention employing a cooled liquid core.

Referring now to FIGURE 1, we have shown a dielectric sphere 1 which is understood to be made of a low-loss material having a dielectric constant of about 2.4. This sphere may be made to have a dielectric constant of exactly 2.4 by making it of a solid spherical mass of Stycast TPM-5 casting resin, as made by Emerson & Cuming, Incorporated, of Canton, Massachusetts. It can also be made in any of the various known ways for producing low-loss materials of selected dielectric constants; for example, spheres in the desired range of dielectric constant 2.1 to 3.7 may be made by filling a thin spherical shell, which may be made of two hemispheres of fiber glass laminates secured together by a laminated tape of fiber glass, with a mixture of finely divided silica and titania. The dielectric constant may be adjusted by varying the ratio of titania to silica. For example, a mixture of 60% titania and 40% silica by weight will give an approximate dielectric constant of 3.50, and a mixture of 20% titania and 80% silica will give a dielectric constant of approximately 2.4. The dielectric constant of the thin shell is not particularly critical, since it has been found that a thin layer of low-loss material of relatively low dielectric constant does not appreciably effect the reflective qualities of the sphere as a whole at radar frequencies.

As shown, the sphere 1 is provided with a cap 2, of polished metal or the like, which may subtend any desired angle, but for example may subtend an angle of 140° to give the sphere a fully effective viewing angle of about 140°, with less effective side angles each of about 20°. The spherical cap 2 may be a sheet of metal formed into the shape of a portion of the surface of a sphere. We have also achieved good results with a conducting lacquer applied to the spherical fiber glass laminate. Metal spray is also a possibility; alternatively, a grid work of conductors may be applied. The spherical cap may be spaced slightly away from the surface of the sphere, although good results are achieved by applying the cap directly to the surface.

The sphere 1 may also be used as an omnidirectional reflector, without a reflecting cap, and as an antenna lens. When used as an antenna lens, the sphere may be excited by a feed horn of conventional construction located at the effective focal length, described below, from the center of the sphere and positioned about the sphere to direct the transmitted energy in any desired direction.

We have found that the dielectric constant of the material of which the sphere 1 is made is critically determinative of the properties of the device. Specifically, we have found that radiant energy directed toward a sphere of uniform dielectric constant is not focused at a point as visible light would be, but is spread over a zone, such that it becomes convenient to speak of a line of focus along the line of propagation of the transmitted and reflected radiation.

FIGURE 2 shows a graph of the ratio of the length L of this line of focus to the radius $r_2$ of the sphere 1 as a function of the dielectric constant. We have found that this line has a minimum length in the vicinity of a dielectric constant of 2.9. The length of the focal line increases rather slowly above this value of $k$, and increases more rapidly below it, with an extremely rapid increase occurring below about $k=2.0$.

FIGURE 3 is a graph of the ratio of the effective focal length F, which is essentially the distance from the center of the sphere 1 to the center of its zone of focus, to the radius $r_2$ of the sphere, as a function of the dielectric constant of the sphere. This focal point corresponds approximately to the optimum location for the cap of a capped reflector or the feed horn of a lens antenna. As shown, the focal length increases very rapidly below a dielectric constant of about 2.1.

Referring now to FIG. 4, we have shown a graph made from actual data on the performance of spheres of uniform dielectric constant used as capped reflectors, as uncapped reflectors, and as lens antennas. The ordinate for the reflector curves is in terms of reflectivity in decibels below a flat metal disc of the same diameter, and the ordinate for the antenna curve is in terms of the transmission efficiency. The data has been plotted on a modified logarithmic scale to make it possible to include the lower points.

As shown in FIG. 4, the uncapped reflector performs best at a dielectric constant of about 3, whereas the capped reflector has an optimum value at about 2.7. The antenna would appear to do best at about 1.8. However, values for the capped reflector and antenna must be considered in conjunction with the length of the focal line, as shown in FIG. 2, and the location of the effective focal point, at which the reflector cap or antenna feed horn must be located for best performance. Obviously, it is highly desirable for reasons of efficiency that the effective focal point be located near the surface of the sphere and just outside of it. Thus, a dielectric constant of more than about 3.7 is undesirable because the focal point is too far inside the sphere for good efficiency, and a value of less than about 2.1 is undesirable because the size of the array becomes too great.

Referring now to FIGURE 5, we have shown the performance of typical capped and uncapped spheres of our invention compared with a metal sphere and a circular flat metal plate of the same diameter. Comparing FIG. 5 with FIG. 1, the viewing angle $\theta$ in FIG. 5 is the angle between the principal axis A of the reflecting cap 2 and a transceiver 3 of conventional construction, which comprises a source of radar frequency energy directed toward the sphere 1, and a receiver for measuring the amount of energy reflected along the line of transmission. Since such apparatus is well known to those skilled in the art, it has not been shown in detail.

As shown in FIG. 5, the flat plate has a relatively high reflectivity over a narrow angle of view. The useful monostatic response is confined within less than 6° of the normal to the plane of the plate at the typical frequency employed. The capped reflector of our invention, on the other hand, exhibits reflectivity within about 1 db of that of the flat plate (that is, within 1 db of theoretical maximum) over a viewing angle almost 70° on either side of the axis of the 140° reflective cap over a frequency range of many octaves. The reflectivity begins to fall off as the line-of-sight of the transceiver 3 approaches an angle at which the line-of-sight no longer passes through the reflecting cap. Over the angle of approximately 140° in which it is most effective, the capped reflector of our invention may be compared with the best capped Luneberg reflectors. With a sphere of dielectric constant 2.4, we have found reflectivities ranging from theoretical at 3,000 mc. to 3 db below theoretical at 9375 mc.

The uncapped sphere of our invention has a uniform response over 360°, at a level which is below that of the capped sphere but still much greater than that of the metal sphere. Thus, an uncapped reflector much smaller than the equivalent metal surfaced sphere, and yet equally simple in construction, could be employed as a communication satellite with greatly reduced launching effort.

We have also found that the bistatic reflectivity of the uncapped omnidirectional reflector of our invention is substantially greater than that of a metal sphere in the bistatic angle range below about 10 to 15 degrees. Thus, such a reflector may be used quite effectively as a bistatic reflector.

Some electrical advantages, such as reduction of the length of the focal zone or reduction of spherical aberrations, accrue from the use of two radial zones having slightly different dielectric constants, each within the range of 2.1 to 3.7. In addition, the problem of cooling a large lens which must transmit large amounts of power is eased by the use of a thick-walled spherical plastic tank as the outer dielectric "step" and a dielectric liquid core which can be continuously circulated through a remote external heat exchanger. Such a construction is shown in FIG. 6, in which a sphere of essentially uniform dielectric constant is shown, comprising a hollow spherical tank 4 filled with a liquid dielectric 5. The liquid 5 may be circulated through a heat exchanger 6 by means of a pump 7, through conduits 8 and 9 connected through the walls of the tank 4, as schematically indicated, so that the heat generated in the tank may be removed by a suitable cooling fluid. The conduits 8 and 9 may be made of flexible low loss plastic material, and the pump and heat exchanger placed in a remote location, to avoid interference with the electrical performance of the device.

The device of our invention can be made in a wide range of sizes. For example, we have made units as small as 2 inches in diameter and as large as 30 inches in diameter. For some uses, it may be desirable to make spheres many feet in diameter. We have tested our reflector at many frequencies in the range from 950 megacycles to 25,000 megacycles, and it would be expected that the advantages of our invention would be realized at frequencies up to 70,000 mc. or higher.

Although the preferred geometry of our invention is spherical, variation from the spherical shape may be made. For example, the nose of an airplane or missile may be ogival, and it may be desirable to use the device of our invention at this point for reflectivity enhancement. A modified sphere may be a good compromise between reflectivity characteristics and mechanical structure. Thus, a hemisphere backed by a circular metal plate makes an extremely efficient reflector over a solid angle of 180°. In fact, many different sectors of a sphere may be employed, so long as radial surfaces are made conductive, as by a metallic backing sheet. Other portions of a sphere may also be useful.

While we have described various embodiments of our invention in detail, many changes and variations will be apparent to those skilled in the art upon reading our description, and such may be made without departing from the scope of our invention.

Having thus described our invention, what we claim is:

Microwave directive apparatus, comprising a spherical tank having a dielectric constant of about 2.4 filled with a liquid having a dielectric constant of about 2.4, a heat exchanger having connections to said tank, and means for circulating liquid from said tank through said heat exchanger to remove heat generated by electrical dissipation in said tank.

References Cited in the file of this patent

UNITED STATES PATENTS

| | | |
|---|---|---|
| 2,580,921 | Iams | Jan. 1, 1952 |
| 2,921,305 | Cole et al. | Jan. 12, 1960 |